(12) United States Patent
Molin et al.

(10) Patent No.: US 8,290,316 B2
(45) Date of Patent: Oct. 16, 2012

(54) SELF-REFERENCED OPTICAL FIBER SENSOR AND RELATED SENSOR NETWORK

(75) Inventors: Stéphanie Molin, Draveil (FR); Daniel Dolfi, Orsay (FR); Jean-Pierre Huignard, Paris (FR); Martine Doisy, Plascassier (FR); Loïc Morvan, Orsay (FR); Jean-Paul Pocholle, La Norville (FR)

(73) Assignee: Thales, Neuilly sur Seine (FR)

( * ) Notice: Subject to any disclaimer, the term of this patent is extended or adjusted under 35 U.S.C. 154(b) by 252 days.

(21) Appl. No.: 12/933,057

(22) PCT Filed: Mar. 16, 2009

(86) PCT No.: PCT/EP2009/053100
§ 371 (c)(1),
(2), (4) Date: Sep. 16, 2010

(87) PCT Pub. No.: WO2009/115501
PCT Pub. Date: Sep. 24, 2009

(65) Prior Publication Data
US 2011/0019179 A1   Jan. 27, 2011

(30) Foreign Application Priority Data

Mar. 18, 2008   (FR) ...................................... 08 01482

(51) Int. Cl.
*G02B 6/00* (2006.01)
*G01D 5/353* (2006.01)
*G01B 11/16* (2006.01)
*G01V 1/18* (2006.01)
*H04J 14/02* (2006.01)
*G01J 1/04* (2006.01)

(52) U.S. Cl. ................ 385/12; 385/11; 385/37; 356/32; 356/450; 356/477; 367/149; 398/84; 250/227.11; 250/227.14; 250/227.16; 250/227.17; 250/227.18

(58) Field of Classification Search .................... 385/14, 385/13, 12, 11, 37; 398/79, 82, 92, 87; 250/227.11, 250/227.14, 227.16, 227.17, 227.18; 356/32, 356/450, 453, 477, 478; 367/149
See application file for complete search history.

(56) References Cited

U.S. PATENT DOCUMENTS
4,320,475 A   3/1982   Leclerc et al.
(Continued)

FOREIGN PATENT DOCUMENTS
FR   2913110 A1   8/2008
(Continued)

OTHER PUBLICATIONS

C. Menadier, et al., "The photonic sensor", Instrum. Control Syst. vol. 40, 114-120 (1967).
(Continued)

Primary Examiner — Brian Healy
(74) Attorney, Agent, or Firm — Baker & Hostetler LLP

(57) ABSTRACT

The general field of the invention is that of fiber-optic sensors comprising at least one measurement optical fiber having an optically pumped doped amplifying medium, the optical characteristics of which are sensitive to a physical quantity, the fiber having at least one Bragg grating. The fiber is designed so as to generate, in the amplifying medium, two optical waves having different optical frequencies that propagate in the same direction after reflection on the Bragg grating and are emitted by the amplifying medium, the two optical frequencies depending on the physical quantity. The two waves may be generated using either a birefringent polarization-maintaining fiber or a DBR (Distributed Bragg Reflector) laser cavity. Notably, this sensor may be used as a hydrophone.

7 Claims, 4 Drawing Sheets

U.S. PATENT DOCUMENTS

| | | | |
|---|---|---|---|
| 5,844,927 | A | 12/1998 | Kringlebotn |
| 6,442,304 | B1 | 8/2002 | Crawley |
| 6,630,658 | B1 | 10/2003 | Bohnert |
| 6,668,105 | B2 | 12/2003 | Chen |
| 6,782,205 | B2 * | 8/2004 | Trisnadi et al. .................. 398/94 |
| 6,885,784 | B2 | 4/2005 | Bohnert |
| 7,245,789 | B2 * | 7/2007 | Bates et al. ........................ 385/7 |
| 7,251,023 | B2 | 7/2007 | Bohnert et al. |
| 7,283,216 | B1 * | 10/2007 | Geng et al. .................... 356/35.5 |
| 7,433,045 | B2 * | 10/2008 | Ronnekleiv et al. ........... 356/478 |
| 7,483,598 | B2 * | 1/2009 | Loock et al. ..................... 385/12 |
| 2005/0078316 | A1 * | 4/2005 | Ronnekleiv et al. ........... 356/478 |
| 2006/0126435 | A1 | 6/2006 | Tam et al. |
| 2011/0019179 | A1 * | 1/2011 | Molin et al. ...................... 356/32 |

FOREIGN PATENT DOCUMENTS

| | | |
|---|---|---|
| GB | 2 299 203 A | 9/1996 |
| WO | 02/48654 A1 | 6/2002 |

OTHER PUBLICATIONS

B. Culshaw, "Optical fiber sensor technologies: opportunities and—perhaps—pitfalls", J. Light. Tech. vol. 22, No. 1, 39-50 (2004).

V. Vali, et al., "Fiber ring interferometer", Appl. Opt. vol. 15, No. 5, 1099-1102 (1976).

P. Nash "Review of interferometric optical fiber hydrophone technology", IEE Proc. Radar Sonar Navig. vol. 143, No. 3, 204-209 (1996).

L. Thevenaz, et al., "Monitoring of large structures using distributed Brillouin fiber sensing", Proceedings of the 13th International Conference on optical fiber sensors (OFS-13), Korea, SPIE vol. 3746, 345-348 (1999).

S.W. James, et al., "Simultaneous independent temperature and strain measurement using in-fiber Bragg grating sensors", Elect. Lett. 32 (12) 1133-1134 (1996).

D. Kersey, et al., "Fiber Grating Sensors", J. Light Techn. vol. 15, No. 8, 1442-1463 (1997).

J. Hill, et al., "DFB fiber-laser sensor developments", OFS-17 Proc. SPIE vol. 5855, 904-907 (1992).

C. Sun, et al., "Serially multiplexed dual-point fiber-optic acoustic emission sensor", J. Light Techn. vol. 22, No. 2. 487-493 (2004).

S. Abad, et al., "Interrogation of wavelength multiplexed fiber Bragg gratings using spectral filtering and amplitude-to-phase optical conversion", J. of Light. Techn. vol. 21, No. 1, 127-131 (2003).

Kumar, et al., "Studies on a few-mode fiber-optic strain sensor based on LP01-LP02 mode interference", J. Light. Techn. vol. 19, No. 3, 358-362 (2001).

P. E. Bagnoli, et al., "Development of an erbium-doped fibre laser as a deep-sea hydrophone", J. of Optics A: Pure Appl. Opt. 8, S535-S539 (2006).

D. J. Hill, et al., "A fiber laser hydrophone array", SPIE Conference on Fiber Optic Sensor Technology and Applications vol. 3860, 55-66 (1999).

S. Foster, et al., "A Fibre Laser Hydrophone," corresponds to "Ultra thin fiber laser hydrophone research through government-industry collaboration" OFS 2005-2006 cited in specification), 17th International Conference on Optical Fibre Sensors, Proceedings of SPIE vol. 5855, Bellingham, WA, 627-630 (2005).

A. Brignon, et al., "Efficient degenerate four-wave mixing in a diode-pumped microchip Nd:YVO4 amplifier", Opt. Lett. vol. 20, No. 6, 548-550 (1995).

P. Yeh, "Two-wave mixing in nonlinear media", IEEE. J. Quantum Electr. vol. 25, No. 3, 484-518 (1989).

S.T. Fisken "Transient Bragg Reflection gratings in erbium-doped fiber amplifiers", Opt. Lett. vol. 17, No. 24, 1776-1778 (1992).

B. Fischer, et al., "Nonlinear wave mixing and induced gratings in erbium-doped fiber amplifiers", Opt. Lett. vol. 18, No. 24, 2108-2110 (1993).

D. Armani, et al., "Re-configurable fluid circuits by PDMS elastomer micromachining", 12th IEEE international conference on Micro Electro Mechanical Systems (MEMS '99), Orlando, Florida, USA (1999).

* cited by examiner

SELF-REFERENCED OPTICAL FIBER SENSOR AND RELATED SENSOR NETWORK

CROSS-REFERENCE TO RELATED APPLICATIONS

This application is a National Stage of International patent application PCT/EP2009/053100, filed on Mar. 16, 2009, which claims priority to foreign French patent application No. FR 08 01482, filed on Mar. 18, 2008, the disclosures of which are incorporated by reference in their entirety.

FIELD OF THE INVENTION

The field of the invention is that of fiber-optic sensors for measuring physical quantities. Sensors based on optical fibers have been studied for almost thirty years. On this subject, the reader may refer, for example, to the publication by C. Menadier, C. Kissenger and H. Adkins entitled "The photonic sensor", Instrum. Control Syst. Vol. 40, 114 (1967). They benefit from the advantages of optical fibers which, apart from their low weight, compact size, cost and insensitivity to electromagnetic interference, have low loss, have a high bandwidth and are suitable for multiplexing techniques and for the use of distributed amplifiers or sensors.

BACKGROUND

The applications of fiber-optic sensors are diverse. Mention may be made of the publication by B. Culshaw entitled "Optical fiber sensor technologies: opportunities and—perhaps—pitfalls", J. Light. Tech. Vol. 22, No. 1, 39 (2004). The most frequent applications relate to stress, temperature and pressure detection, but there are also applications in the field of detecting current/voltage, displacement, torsion, acceleration, gases, etc. The techniques employed are very varied, the ones most actively studied relating to:

- fiber gyros (see, on this subject, V. Vali and R. W. Shorthill, "Fiber ring interferometer", Appl. Opt. Vol. 15, No. 5, 1099 (1976));
- other interferometric methods (see P. Nash, "Review of interferometric optical fiber hydrophone technology", IEE Proc. Radar Sonar Navig. Vol. 143, No. 3 (1996)); and
- backscattering techniques such as Raman, Brillouin or Rayleigh scattering. The reader may refer, in particular, to L. Thévenaz et al., "Monitoring of large structures using distributed Brillouin fiber sensing", Proceedings of the 13$^{th}$ International Conference on optical fiber sensors (OFS-13), Korea, SPIE Vol. 3746, 345 (1999).

Almost half of the fiber sensors currently studied employ Bragg gratings (S. W. James et al., "Simultaneous independent temperature and strain measurement using in-fiber Bragg grating sensors", Elect. Lett. 32 (12) 1133 (1996)). In particular, the use of laser active sensors based on Bragg gratings is widespread. These include DBR (Distributed Bragg Reflector) lasers (see D. Kersey et al., "Fiber Grating Sensors">>, J. Light. Techn. Vol. 15, No. 8 (1997)) or DFB (Distributed FeedBack) lasers (see J. Hill et al., "DFB fibre-laser sensor developments", OFS-17 Proc. SPIE Vol. 5855 p. 904 and U.S. Pat. No. 8,844,927 entitled "Optical Fiber Distributed FeedBack Laser" (1998)). The spectral purity of these lasers enables a substantial increase in sensitivity to be achieved compared with passive Bragg grating devices.

In the case of fiber Bragg grating hydrophones, the quantity to be measured is a strain applied to the sensor. The required sensitivity is such that, whatever the type of fiber grating used (DBR, DFB, passive Bragg), the interrogation system is complex. This is because the strain on the sensor induces a phase shift on the optical wave which propagates therein. To measure this phase shift requires comparing the phase of the signal in question with a reference signal. Among the methods used, two technical solutions may chiefly be distinguished for obtaining a reference wave. The first solution consists in using a reference wave coming from a second sensor similar to the first but isolated from interference. This method is described in the article by C. Sun et al., "Serially multiplexed dual-point fiber-optic acoustic emission sensor", J. Light. Techn. Vol. 22, No. 2 (2004). The second solution consists in splitting the signal of interest into two arms of very different optical paths and in making these two arms interfere with each other. In this case, the reference wave is a retarded copy of the signal wave. The reader may refer to the publication by S. Abad et al., "Interrogation of wavelength multiplexed fiber Bragg gratings using spectral filtering and amplitude-to-phase optical conversion", J. of Light. Techn. Vol. 21, No. 1 (2003) for all information about this second method.

The use of active sensors emitting two optical waves of different frequencies is one conceivable solution for dispensing with interferometer benches or an additional sensor. DFB-FLs (Distributed FeedBack Fiber Lasers) oscillating on two polarization states or two propagation modes, whether transverse or longitudinal, have already formed the subject of patents and publications. Mention may be made of the following patents: U.S. Pat. No. 5,844,927 from Optoplan (Norway) 1998 "Optical fiber DFB laser"; U.S. Pat. No. 6,885,784 from Vetco Gray Controls Ltd (UK) 2005 "Anisotropic DFB fiber laser sensor"; and U.S. Pat. No. 6,630,658 from ABB Research Ltd (Switzerland) 2003 "Fiber laser pressure sensor" and the publication by Kumar et al., "Studies on a few-mode fiber-optic strain sensor based on $LP_{01}$-$LP_{02}$ mode interference", J. Light. Techn. Vol. 19, No. 3 (2001).

Starting from these principles, various laser DFB fiber hydrophone architectures have been proposed. Details of these will be found in the following publications: P. E. Bagnoli et al., "Development of an erbium-doped fibre laser as a deep-sea hydrophone", J. of Optics A: Pure Appl. Opt. 8 (2006); D. J. Hill et al., "A fiber laser hydrophone array", SPIE Conference on Fiber Optic Sensor Technology and Applications Vol. 3860, 55 (1999); or S. Foster et al., "Ultra thin fiber laser hydrophone research through government-industry collaboration" OFS 2005-2006.

SUMMARY OF THE INVENTION

However, the proposed architectures are still complex. The object of the invention is to make use of what are called "self-referenced" fiber Bragg grating active sensors based on Bragg grating fiber lasers. What is understood to be a "self-referenced" sensor is any sensor generating two measurement signals carrying the information to be measured—in the present case, the signals are two optical waves emitted at different optical frequencies. The differential measurement of the variations between the frequencies of the two signals is representative of the information to be measured. Thus, the quantity to be measured is obtained directly by the beats between these two optical waves and no longer requires either an interferometer or a reference sensor. The fiber-optic sensor architectures are thus considerably simplified by eliminating the interferometer modules with which their interrogation benches are conventionally equipped. The devices according to the invention are preferentially applicable to the production of fiber-optic hydrophones, but they may be advantageously used for measuring various physical quantities. In particular, they may be used as strain sensors: the information about the quantity to be measured, for example the strain applied to the sensor, is obtained via the beat frequency of the two waves output by the sensor.

More precisely, the subject of the invention is a fiber-optic sensor comprising at least:
- a measurement optical fiber comprising a doped amplifying medium, the optical characteristics of which are sensitive to a physical quantity, the fiber having at least one Bragg grating, in which the fiber is designed to generate two optical waves having different optical frequencies in the amplifying medium, which waves propagate in the same direction after reflection on the Bragg grating and are emitted by the amplifying medium, the two optical frequencies depending on the physical quantity;
- optical pumping means for pumping said amplifying medium to ensure population inversion of said medium and to generate the two optical waves; and
- the sensor including means for analyzing the frequency difference between the two optical waves.

There are two preferred embodiments of the invention. In a first embodiment, the optical fiber is a birefringent polarization-maintaining fiber, having two eigenaxes having respective refractive indices $n_e$ and $n_o$, and the sensor includes means for emitting an optical wave, called a probe wave, said wave creating, by interference with itself after reflection on the Bragg grating, a dynamic gain grating generating two optical waves having different optical frequencies.

In a second embodiment, the fiber has a second Bragg grating, the first and second gratings being separated by a section of amplifying fiber, the assembly, consisting of the first Bragg grating, the section of amplifying fiber and the second Bragg grating, forming a laser cavity of the DBR (Distributed Bragg Reflector) type designed so that at least two modes with different optical frequencies oscillate in the laser cavity.

The fiber is doped with rare-earth ions.

More particularly, the sensor is a strain sensor, the physical quantity to be measured being a mechanical strain applied to the fiber. In this context, the sensor may be a hydrophone.

In addition, the sensor may have a structure substantially in the form of a cylinder around which the measurement optical fiber is wound, said cylinder being made of a material having the lowest possible Young's modulus so as to amplify the strain exerted on the fiber, the material of the cylinder being, for example, polydimethylsiloxane.

The invention also relates to an array of fiber-optic sensors as defined above, all the sensors being placed in series on one and the same optical fiber and the array including a wavelength multiplexer placed between said fiber and the analysis means.

BRIEF DESCRIPTION OF THE DRAWINGS

The invention will be better understood and other advantages will become apparent on reading the following description given by way of nonlimiting example and by virtue of the appended figures in which.

DETAILED DESCRIPTION

Figure 1:
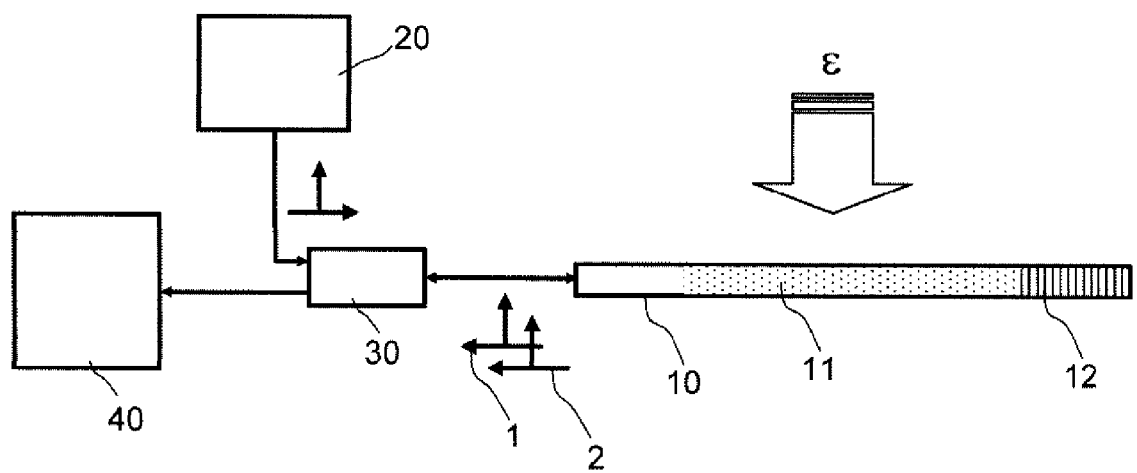
FIG. 1 is a block diagram showing the general form of a fiber-optic sensor according to the invention.

As illustrated in FIG. 1, a fiber-optic sensor according to the invention comprises at least:
- a measurement optical fiber 10 comprising a doped amplifying medium 11, the optical characteristics of which are sensitive to a physical quantity $\epsilon$, the fiber having at least one Bragg grating 12 and being designed so as to generate two optical waves 1 and 2 of different optical frequencies denoted by $v_1(\epsilon)$ and $v_2(\epsilon)$ propagating in the same direction after reflection on the Bragg grating 12 and emitted by the amplifying medium 11, the two optical frequencies depending on the physical quantity;
- optical pumping means 20 for pumping said amplifying medium, ensuring population inversion of said medium. This may be a diode laser emitting at a frequency matched to the gain medium forming the sensor. This wavelength may for example be 980 nm or 1480 nm if the fiber is an erbium-doped fiber. In this case, the emission frequencies are close to 1550 nm;
- the sensor includes splitter means 30, for splitting the incident and reflected waves, and analysis means 40, for analyzing the frequency difference between the two optical waves, the two waves being received by a photodetector (not shown in FIG. 1).

The two emitted optical frequencies $v_1(\epsilon)$ and $v_2(\epsilon)$ create beats on the detector at the frequency $\Delta v(\epsilon)=v_1(\epsilon)-v_2(\epsilon)$, which may also be expressed as $\Delta v(\epsilon)=v_1-v_2+\delta v(\epsilon)$. The two optical frequencies $v_1(\epsilon)$ and $v_2(\epsilon)$ and the value $\Delta v(\epsilon)$ are functions of the longitudinal strains experienced by the optical fiber of the sensor. Therefore, this strain induces a phase modulation of the interference signal. Specifically, if $E_1$ and $E_2$ are the optical fields of the waves at the frequencies $v_1$ and $v_2$, the photocurrent output by the detector is given by:

$$i_{ph}(t) \propto |E_1|^2+|E_2|^2+2|E_1||E_2|\cos[2\pi\Delta vt]$$

i.e. $i_{ph}(t) \propto |E_1|^2+|E_2|^2+2|E_1||E_2|\cos[2\pi v_1 t-2\pi v_2 t+2\pi\delta vt]$.

The signal to be processed appears directly as a frequency modulation around a carrier wave at the frequency $v_1-v_2$. The two frequencies are typically spaced apart by $v_1-v_2$ of the order of a few GHz to a few tens of GHz, which corresponds, in the near infrared, to a wavelength difference of around 0.16 nm. The phase modulation $\delta v(\epsilon)$ is obtained by heterodyne detection using a local oscillator with a frequency close to $v_1-v_2$, enabling the signal to be translated to low frequencies, more suitable for digital processing. The local oscillator must have a sufficient spectral purity so as not to limit the measurement of the signal $\delta v(\epsilon)$, the amplitude of which may be of the order of 1 mHz. Current commercial synthesizers have a stability of around $2\times10^{-10}$/day, which is amply sufficient for this type of sensor.

One important industrial application of this type of sensor is for strain measurement, and most particularly for strain measurement in the special case in which the sensor is a hydrophone. In this case, it is advantageous to determine the sensitivity of the sensors according to the invention and to compare this with the quantity of interest in hydrophone applications, namely the "deep sea state zero" (DSS0) noise. Thus, the smallest signal that can be detected by the sensor must correspond to a spectral pressure noise density of the order of $P=150$ μPa/$\sqrt{Hz}$ at 1 kHz.

The longitudinal strain corresponding to an applied pressure of 150 µPa/√Hz on an optical fibre is obtained from the equation:

$$\epsilon_z = (2\theta - 1) P/E$$

in which E is Young's modulus and θ is Poisson's ratio.

For silica, $E=72\times10^9$ Pa and $\theta=0.23$, which corresponds to a longitudinal strain equal to $\epsilon_z = -0.75\times10^{-15}/\sqrt{Hz}$.

The existing devices allow optimum transfer of the acoustic wave in elongation mode of the cavity, causing a gain in elongation of the order of 40 dB, which is equivalent to a minimum pressure to be detected of the order of 1 Pa, and therefore to a longitudinal strain equal to:

$$\epsilon_z = -0.75\times10^{-11}/\sqrt{Hz}.$$

All the devices according to the invention are based on Bragg gratings in optical fibers. The shift $\delta\lambda_B$ of the Bragg wavelength of the sensors of this type is typically:

$$\delta\lambda_B = 2n_e \Lambda \epsilon_z - 2n_e \Lambda \left[ \frac{n_e^2}{2}((p_{11}+p_{12})\epsilon_r + p_{12}\epsilon_z) \right] \quad (E1)$$

where:

$\epsilon_z$ and $\epsilon_r$ are the longitudinal and radial strains of the fiber ($\epsilon_r = \epsilon_z$ in the isotropic case)

$n_e$ is the effective refractive index of the fiber;

$\Lambda = \lambda_B/2n_e$ is the period of the grating;

$p_{11}$ and $p_{12}$ are the longitudinal and transverse elastooptic coefficients of the fiber.

In the case of silica, $n_e=1.456$, $p_{11}=0.121$ and $p_{12}=0.265$.

The frequency shift of a Bragg grating fiber laser due to a static longitudinal strain is deduced from equation E1. The shift is approximately equal to $\delta v_1 \approx 0.78\epsilon_z v_1$, this equation being confirmed experimentally.

Assuming that this equation remains valid in dynamic mode, the optical frequency shift $\delta v_1$ emitted by a Bragg grating laser emitting a wave at an optical frequency $v_1$, subjected to a pressure equivalent to the deep sea state zero, is $\lambda \sim 1.55$ µm corresponding to a frequency $v_1 \approx 192 \times 10^{12}$ Hz:

$$\delta v_1 \approx 0.78 \times 0.75 \times 10^{-15} \times 192 \times 10^{12} \approx 112 \text{ mHz}/\sqrt{Hz}.$$

This corresponds, considering a mechanical amplification of around 40 dB, i.e. to a longitudinal dynamic strain to be measured of the order of $10^{-11}/\sqrt{Hz}$, to $\delta v_1 \approx 1$ kHz/$\sqrt{Hz}$.

The interrogation system of the sensor must be capable of measuring very small frequency shifts of the laser, of the order of 1 kHz/$\sqrt{Hz}$ in the abovementioned case, i.e. it is necessary to have a monofrequency laser with a very low noise in the acoustic frequency band of the sensor.

There are various methods for generating the two optical frequencies $v_1(\epsilon)$ and $v_2(\epsilon)$. A first embodiment is derived from that described in French patent application entitled "Capteur de grandeurs physiques à fibre optique insensible aux grandeurs statiques [Fiber-optic sensor for detecting physical quantities but insensitive to static quantities]" filed under number FR 07/01454.

The basic principle of the physical process of mixing two waves in an amplifying medium, as described in the above application, is the following: the sensor comprises a doped optical fiber optically pumped beforehand so as to achieve population inversion between its energy levels. The fiber includes a Bragg mirror. If what is called a "probe" wave at an optical frequency:

$$v_1 = \frac{c}{\lambda_1}$$

(in which C and $\lambda_1$ represent the velocity of light and the wavelength in vacuum respectively) and of coherence length $L_{coh}$ at least equal to the length L of the fiber is injected, this wave is reflected on the Bragg mirror and gives rise to a reflected wave in the same polarization state and with the same wavelength. These two waves, denoted by wave 1 and wave $1_{reflected}$, propagate in the amplifying medium in opposite directions and interfere with each other. This results in a periodic spatial variation of the total intensity of the wave at the frequency $v_1$ in the medium, which results, in the bright fringes, in periodic saturation of the gain in the amplifying medium. The gain grating thus generated serves to diffract and couple the two waves that have created it. Thus, wave 1 is diffracted on the gain grating which it has written by interference with wave $1_{reflected}$ in order to give a diffracted wave, namely wave $1_{diffracted}$, propagating in the same direction as wave $1_{reflected}$. The period of the gain grating is:

$$\Lambda = \frac{\lambda_1}{2n} = \frac{c}{2nv_1}$$

in which n represents the refractive index of the amplifying medium seen by wave 1 and wave $1_{reflected}$. Thus, this diffracted wave has a wavelength that depends on the optical index, and therefore on the applied strain.

The first embodiment uses the principle of diffracted wave generation described above. However, the optical fiber employed is a length of highly birefringent fiber amplifier in which two-wave mixing is caused by gain saturation. The use of this type of fiber is described notably in the following publications: A. Brignon, G. Feugnet, J.-P. Huignard, and J.-P. Pocholle, "Efficient degenerate four-wave mixing in a diode-pumped microchip Nd:YVO4 amplifier", Opt. Lett. Vol. 20, No. 6, 548-550 (1995)—P. Yeh, "Two-wave mixing in nonlinear media", IEEE. J. Quantum Electr. Vol. 25, No. 3, 484-518 (1989)—S. T. Fisken, "Transient Bragg Reflection gratings in erbium-doped fiber amplifiers", Opt. Lett. Vol. 17, No. 24, 1776-1778 (1992)—B. Fischer, J. L. Zyskind, J. W. Sulhoff and D. J. DiGiovanni, "Nonlinear wave mixing and induced gratings in erbium-doped fiber amplifiers", Opt. Lett. Vol. 18, No. 24, 2108-2110 (1993).

Figure 2:
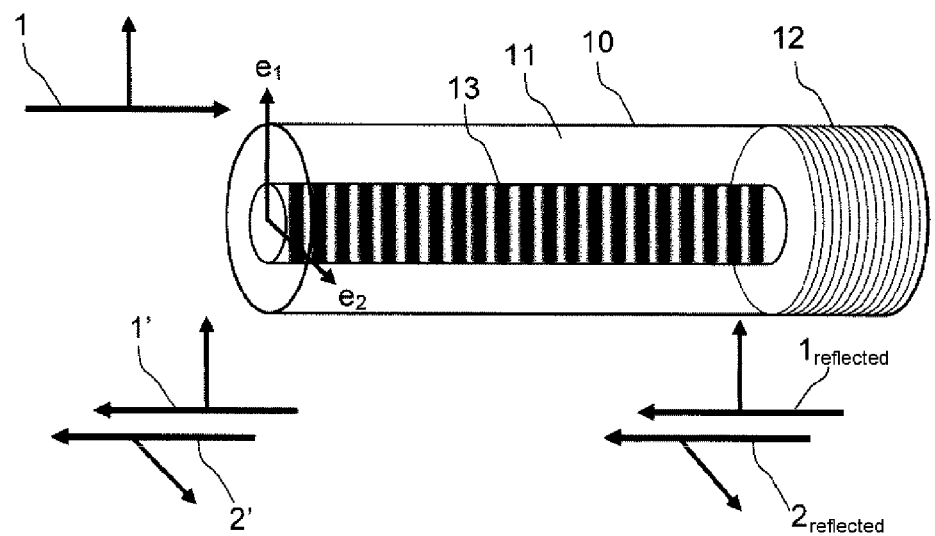
FIG. 2 shows a first embodiment employing polarization-maintaining fibers.

One view of the fiber 10 according to this first embodiment is shown in FIG. 2. The two eigenaxes of the polarization-maintaining fiber amplifier are denoted by $\vec{e}_1$ and $\vec{e}_2$ and the respective refractive indices by $n_e$ and $n_o$. It is assumed for example that the pump wave 1 propagates at the frequency $v_1$ and is polarized along the axis $\vec{e}_1$. Its coupling in the amplifying medium with the wave $1_{reflected}$ reflected, i.e. reflected by the Bragg mirror, generates a coherent gain grating 13 over the entire length of the fiber. This device may be considered to be a laser cavity of the DFB (Distributed FeedBack) type injected at the frequency $v_1$. Some of the amplified spontaneous emission photons polarized along the axis $\vec{e}_2$ may derive from a wave oscillating in this cavity. Said wave must satisfy the phase tuning conditions of the DFB device. The refractive index seen by this wave is $n_e$, with differs from $n_o$.

Consequently, its tuning wavelength $\lambda_2$ in the DFB grating differs from $\lambda_1$ and its optical frequency $$v_2 = \frac{c}{\lambda_2}$$

differs from $$v_1 = \frac{c}{\lambda_1},$$

where c and $\lambda_i$ are taken in vacuo. The phase tuning equation is given by:

$$\Lambda = \frac{\lambda_1}{2n_e}$$

for wave 1 and wave $\mathbf{1}_{reflected}$, and $$\Lambda = \frac{\lambda_2}{2n_o}$$

for wave 2 and wave $\mathbf{2}_{reflected}$ (wave $\mathbf{2}_{reflected}$ corresponding to the reflection of wave 2 on the fixed DFB mirror).

Deduced from this is the optical frequency of wave 2 as a function of the frequency of wave 1:

$$v_2 = \frac{n_e(v_1)}{n_o(v_2)}v_1.$$

The two waves 1' and 2' diffracted by the gain grating 13, at the optical frequencies $v_1(\epsilon)$ corresponding to the injected wave and $v_2(\epsilon)$, the nascent wave along the perpendicular polarization direction, give rise to beats on the detector at the frequency $\Delta v(\epsilon) = v_1(\epsilon) - v_2(\epsilon) = v_1 \delta v_1(\epsilon) - v_2 - \delta v_2(\epsilon)$. The frequency shift $\delta v_1(\epsilon) - \delta v_2(\epsilon)$ around $v_1 - v_2$ depends on the strain $\epsilon$ seen by the sensor.

To give an example, a commercially available fiber, the birefringence $\Delta n = n_e - n_o$ of which lies in the range $\Delta n \approx 10^{-3} - 10^{-4}$, causes a separation $\Delta\lambda = \lambda_1 - \lambda_2$ between the two generated wavelengths of the order of $\Delta\lambda \approx 0.1 - 1$ nm, i.e. a frequency difference $\Delta v = v_1 - v_2$ lying in the window $$\Delta v = \frac{\Delta n}{n_o}v_1 \approx 10 - 100 \text{ GHz.}$$

The frequency modulation of the beat signal is therefore around an RF carrier wave in the 10-100 GHz band.

To calculate the order of magnitude of the optical frequency variation $\delta v_i(\epsilon)$ experienced by each of the two waves output by this device, equation (E1) is used. In the case of an isotropic fiber, the following may be written:

$$\frac{\delta\lambda_{1,2}}{\lambda_{1,2}} \times \frac{1}{\varepsilon} = 1 - \frac{n_{e,o}^2}{2}p_{11} - n_{e,o}^2 p_{12}.$$

This gives, for a birefringent fiber, considering that $n_e = 1.456$ and $n_o = 1.457$ and $\epsilon = -0.75 \times 10^{-11}/\sqrt{Hz}$:

$$\delta v_1(\varepsilon) = 2.318 \times 10^{-12} \times v_1 \text{ and}$$

$$\delta v_2(\varepsilon) = 2.325 \times 10^{-12} \times \frac{n_e}{n_o}v_1 = 2.323 \times 10^{-12} \times v_1.$$

The frequency shift $\delta v_1(\epsilon) - \delta v_2(c)$ around $v_1 - v_2$ (where $v_1 = 192 \times 10^{12}$ Hz) is therefore of the order of $\delta v_1(\epsilon) - \delta v_2(\epsilon) \approx 1$ Hz/$\sqrt{Hz}$.

This shift may be amplified, for example, by applying a longitudinal strain of different amplitude on each of the axes of the birefringent fiber ($\epsilon_z^o \neq \epsilon_z^e$).

This sensor therefore combines a dynamic gain grating, by wave mixing by saturation of the gain in a fiber amplifier, with the writing of a fixed Bragg mirror using standard UV techniques the fiber amplifier being birefringent. This sensor is therefore a two-frequency laser: two orthogonal polarization modes of optical frequencies $v_1$ and $v_2$ are permitted to oscillate in the cavity. These two modes are coupled since they share the same population of excited ions: they possess a constant phase relationship. The fiber section on which the fixed grating is written, which may be of the order of a few centimeters in length, may be either the end of a doped polarization-maintaining fiber or a length of a standard polarization-maintaining fiber, the ordinary and extraordinary refractive indices of which coincide with those of the doped fiber. The dynamic grating is created in the doped fiber with the phase tuning conditions imposed by the presence of the fixed Bragg mirror. The device functions as a DFB laser.

This device may be produced on a great length of fiber, the length of the sensor not being limited by the UV writing techniques used for standard Bragg gratings, and may have a high spectral selectivity. The length of the sensor is a parameter to be adapted to the intended application. Specifically in the case of distributed sensors for a hydrophone antenna, the wavelength of the submarine acoustic signals (~1.5 m to 1 kHz) imposes an upper limit on the size of the sensor.

This device has the advantage of being insensitive to the static pressure. The lifetime of the created gain grating determines the low cutoff frequency of the sensor. In the conventional case in which the rare-earth dopant of the fiber amplifier is an erbium ion, the lifetime of the excited state is of the order of 1 to 10 ms depending on the saturation state of the medium. The sensor presented here thus has a low cutoff frequency of the order of 100 Hz to 1 kHz. For slow perturbations corresponding to phase variations of the incident wave, to local temperature variations or to local static pressure variations, the grating adapts automatically. For higher-frequency perturbations relating to the acoustic wave to be detected, the sensor behaves as a conventional fixed Bragg grating, the elongation or compression of which modulates the reflectivity.

Figure 3:
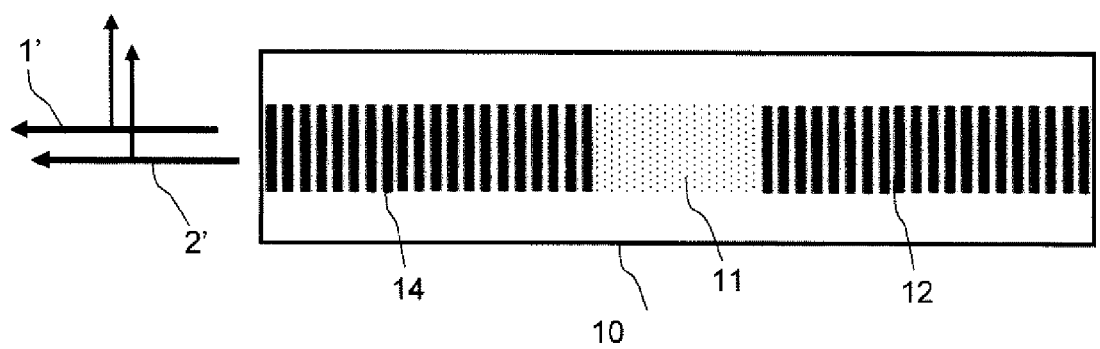
FIGS. 3 and 4 show a second embodiment employing a DBR laser.

The second embodiment of a sensor according to the invention is based on the use of DBR lasers. One view of the fiber employing this second principle is shown in FIG. 3. To produce sensors, DFB lasers are generally used. Their use for this type of application (in particular for hydrophones) is currently expanding rapidly. DFB lasers consist of a continuous Bragg grating etched in an optical fiber amplifier, typically doped with erbium or erbium-ytterbium. They are preferred to DBR fiber lasers, formed from two Bragg gratings 12 and 14 separated by a short length 11 of a few 100 μm of fiber amplifier. This is because, in DBR geometry, the distance between the two Bragg gratings allows the oscillation of several cavity modes lying within the reflection band of the gratings. This multimodal aspect has proved to be deleterious in most hydrophone applications. However, this multimodal aspect has certain advantages in the context of the sensors according to the invention.

This is because if the fiber comprises a DBR laser in which two longitudinal modes 1' and 2' having optical frequencies $v_1$ and $v_2$ can oscillate, any longitudinal strain of the laser cavity with an initial length $L_{initial}$ toward a length $L_{final}$ modifies its free spectral interval (FSL), where $FSL=c/2n L_{initial}$ (in which c is the velocity of light and n is the refractive index of the fiber), by an amount $\Delta ISL=c/2nL_{initial}-c/2n L_{final}$.

Figure 4:
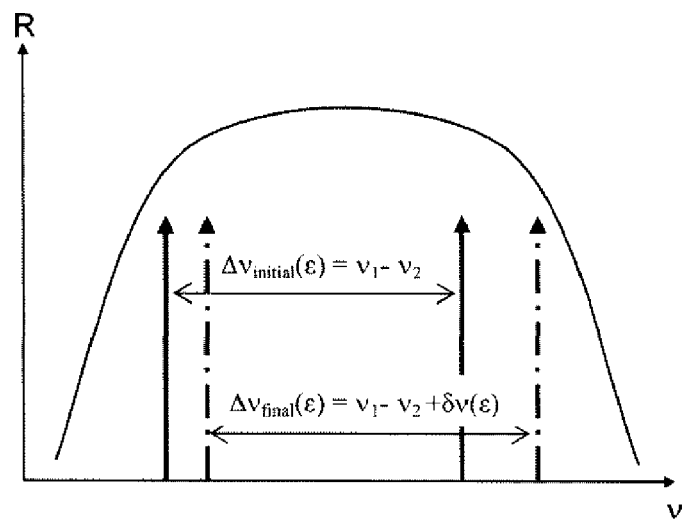

The difference between the two optical frequencies $v_1$ and $v_2$ ($\Delta v_{initial}(\epsilon)=v_1-v_2$) becomes $\Delta v_{final}(\epsilon)=v_1-v_2+\delta v(\epsilon)$ with $\delta v(\epsilon)=\Delta v_{initial} \cdot \Delta L/L$ i.e. $\delta v(\epsilon)=\Delta v_{initial} \cdot \epsilon$ as illustrated in FIG. 4. In this figure, the solid arrows represent the two emitted frequencies with no strain applied to the fiber, the dotted arrows represent the two emitted frequencies with strain applied and the curve shows the reflection band of the Bragg grating as a function of the wavelength.

To give an example, if the effective cavity length is of the order of one centimeter, corresponding to $\Delta v_{initial} \sim 10$ GHz, and in the case of a hydrophone ($\epsilon_z=-0.75 \times 10^{-11}/\sqrt{Hz}$), it is therefore reasonable to expect a variation of the order of $\delta v(\epsilon)=10 \times 10^{-9} \times 10^{-11} \approx 100$ mHz/$\sqrt{Hz}$. This variation is perfectly detectable.

As seen, and in particular for applications of the sensor as a hydrophone, the effects to be measured may be very small. It is therefore advantageous to amplify the strain experienced by the fiber so as to obtain larger frequency variations. The packaging of the fiber-optic sensors is an important subject that has been solved in various ways as described in the U.S. Pat. No. 6,442,304 from Chevron U.S.A. Inc. (San Ramon, Calif.), Sensor Dynamics Ltd (Winchester, Great Britain) and University of Southampton (Southampton, Great Britain) 2002 "Apparatus and method for protecting devices, especially fiber optic devices, in hostile environments" and U.S. Pat. No. 6,668,105 from Systems Planning & Analysis, Inc. (Greenbelt, Md.), 2003 "Fiber optic strain sensor".

Figure 5:
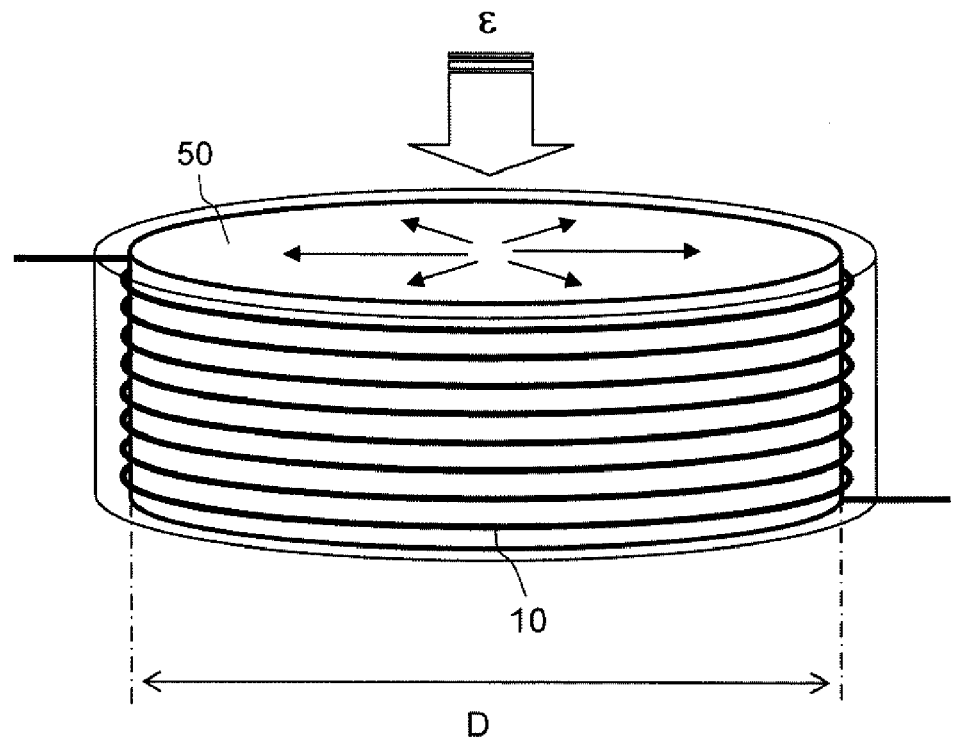
FIG. 5 shows one particular embodiment of the sensor; and, finally

To amplify the strain experienced by the fiber, the sensor may have a structure substantially in the form of a cylinder 50 around which the measurement optical fiber 10 is wound, as illustrated in FIG. 5, said cylinder being made of a material having the lowest possible Young's modulus so as to amplify the strains exerted on the fiber. The optical fiber wound around a cylinder therefore experiences an elongation proportional to the enlargement in the diameter D of the cylinder, this enlargement being represented in FIG. 5 by the cylinder drawn in fine lines. Such an arrangement consequently makes it possible for the effect of the quantity to be measured, directed along the axis of the cylinder, on the elongation of the fiber to be amplified very simply.

The amplifying effect can be easily calculated. Let:
L be the length of the optical fiber;
N be the number of fiber turns around the cylinder;
R be the radius of the cylinder;
P: be the applied pressure;
$\theta_{silica}$ and $E_{silica}$ be the Poisson's ratio and the Young's modulus of the silica used to produce the fiber; and
$\theta_{mat}$ and $E_{mat}$ be the Poisson's ratio and the Young's modulus of the material used to produce the cylinder.

If the pressure is applied directly to the optical fiber, the relative elongation thereof is equal to:

$$\varepsilon_{z,simple} = \frac{\Delta L}{L} = \frac{P \times (2\theta_{silica}-1)}{E_{silica}}.$$

If the pressure is applied along the axis of a cylindrical support around which the optical fiber is wound, the relative elongation thereof is equal to:

$$\varepsilon_{z,amplified} = \frac{\Delta L}{L} = \frac{\Delta R}{R} = \frac{P \times (2\theta_{mat}-1)}{E_{mat}}.$$

The gain in elongation is therefore equal to:

$$\frac{\varepsilon_{z,amplified}}{\varepsilon_{z,simple}} = \frac{(2\theta_{mat}-1) \times E_{silica}}{(2\theta_{silica}-1) \times E_{mat}}.$$

To give an example, the gain in elongation when the material used to produce the cylinder is an elastomer, such as for example PDMS (polydimethylsiloxane) (see in this regard D. Armani, C. Liu and N. Aluru "Re-configurable fluid circuits by PDMS elastomer micromachining", This paper appears in 12$^{th}$ IEEE international conference on Micro Electro Mechanical Systems, (Orlando, Fla., USA), is more than 50 dB.

Specifically, for silica: $E_{silica}=72 \times 10^9$ Pa and $\theta_{silica}=0.23$ and for 1:15 PDMS: $E_{1:15\,PDMS}=3.6 \times 10^5$ Pa and $\theta_{1:15\,PDMS}=-0.28$, which gives:

$$\frac{\varepsilon_{z,amplified}}{\varepsilon_{z,simple}} = 5.78 \times 10^5.$$

The size of the cylinder depends on the intended application. The lower limit of its diameter depends partly on the losses and on the birefringence of the fiber. It should also be noted that if the birefringent fiber is wound in such a way that one of its two eigenaxes is preferentially subjected to the strain, for example if this eigenaxis is perpendicular to the axis of the cylinder over the entire length of the winding, the frequency difference $\delta v_1(\epsilon)-\delta v_2(\epsilon)$ may be increased.

Figure 6:
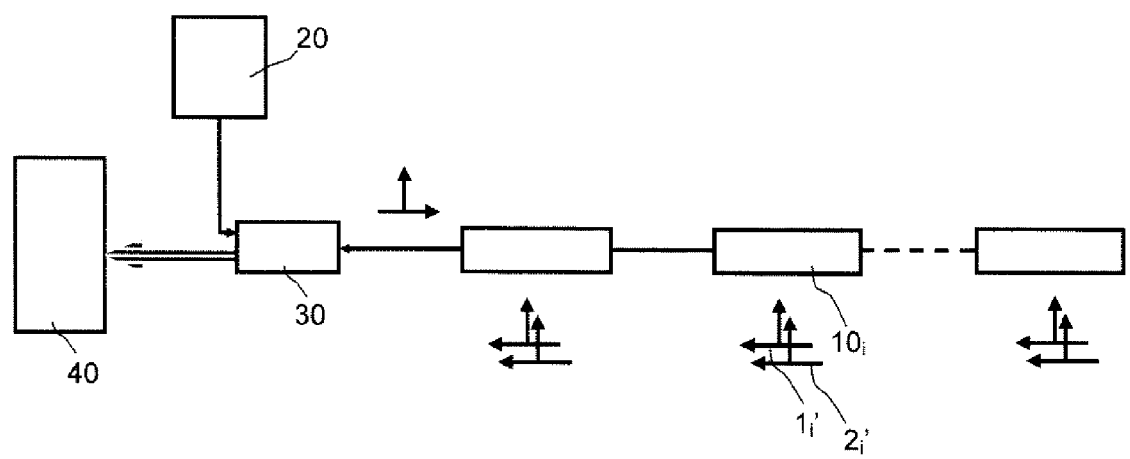
FIG. 6 shows an array of fiber-optic sensors according to the invention.

The above sensors may be easily multiplexed, as illustrated in FIG. 6. To multiplex several sensors i according to the invention, a probe laser 20 propagating in the same direction as the pump has to be added to the device of FIG. 1. This probe laser is either a broad source operating around 1.5 μm or a source that can be tuned around 1.5 μm matched to the Bragg wavelength of the end wall mirrors of the cavity. The sensors may be produced according to the embodiments described above. In this case, each sensor i comprises a fiber 10, that emits two waves 1$_i$' and 2$_i$' having the frequencies $v_{i1}$ and $v_{i2}$.

The multiplexing, enabling the signals coming from the various sensors to be discriminated, may be carried out by various techniques, for example temporal multiplexing or spectral multiplexing.

The invention claimed is:

1. A fiber-optic sensor for measuring a physical quantity, comprising at least:

a measurement optical fiber having at least one amplifying medium and a Bragg grating;

optical pumping means for pumping said amplifying medium to ensure population inversion of said medium;
wherein:
the optical fiber is a birefringent polarization-maintaining fiber, having two eigenaxes having respective refractive indices $n_e$ and $n_o$;
the sensor includes means for emitting an optical wave, called a probe wave, said wave creating, by interference with itself after reflection on the Bragg grating, a dynamic gain grating generating two optical waves having different optical frequencies, the two optical frequencies depending on the physical quantity; and
the sensor includes means for analyzing the frequency difference between the two optical waves.

2. The fiber-optic sensor as claimed in claim 1, wherein the fiber-optic sensor is a strain sensor, the physical quantity to be measured being a mechanical strain applied to the fiber.

3. The fiber-optic sensor as claimed in claim 2, wherein the fiber-optic sensor is a hydrophone.

4. The fiber-optic sensor as claimed in claim 2, wherein the fiber-optic sensor has a structure substantially in the form of a cylinder around which the measurement optical fiber is wound, said cylinder being made of a material having the lowest possible Young's modulus so as to amplify the strain exerted on the fiber.

5. The fiber-optic sensor as claimed in claim 4, wherein the material of the cylinder is polydimethylsiloxane.

6. An array of fiber-optic sensors as claimed in claim 1 wherein all the sensors are placed in series on one and the same optical fiber and in that the array includes a wavelength multiplexer placed between said fiber and the analysis means.

7. An array of fiber-optic sensors as claimed in claim 3, wherein all the sensors are placed in series on one and the same optical fiber and in that the array includes a wavelength multiplexer placed between said fiber and the analysis means.

* * * * *